US012580089B2

(12) United States Patent
Hartig et al.

(10) Patent No.: US 12,580,089 B2
(45) Date of Patent: Mar. 17, 2026

(54) ROBUST AUTOMATIC TRACKING OF INDIVIDUAL TRISO-FUELED PEBBLES THROUGH A NOVEL APPLICATION OF X-RAY IMAGING AND MACHINE LEARNING

(71) Applicant: University of Florida Research Foundation, Inc., Gainesville, FL (US)

(72) Inventors: Kyle Hartig, Newberry, FL (US); Hongcheng Liu, Gainesville, FL (US); Emily Kwapis, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 525 days.

(21) Appl. No.: 17/799,202

(22) PCT Filed: Mar. 10, 2021

(86) PCT No.: PCT/US2021/021658

§ 371 (c)(1),
(2) Date: Aug. 11, 2022

(87) PCT Pub. No.: WO2021/183617

PCT Pub. Date: Sep. 16, 2021

(65) Prior Publication Data

US 2023/0072324 A1 Mar. 9, 2023

Related U.S. Application Data

(60) Provisional application No. 62/987,665, filed on Mar. 10, 2020.

(51) Int. Cl.
*G21C 17/06* (2006.01)

(52) U.S. Cl.
CPC ........... *G21C 17/06* (2013.01); *G21C 17/066* (2013.01)

(58) Field of Classification Search
CPC .................. G21C 17/06; G21C 17/066; G06F 16/50-587; G06F 18/213-21375
(Continued)

(56) References Cited

U.S. PATENT DOCUMENTS

| | | | |
|---|---|---|---|
| 2003/0112919 A1 | 6/2003 | Davies | |
| 2016/0104058 A1 | 4/2016 | He et al. | |
| 2017/0343493 A1 | 11/2017 | Reischig | |

OTHER PUBLICATIONS

Irwanto, Dwi, et al. "Preliminary design study of small power 30-50 MWt experiment power reactor based on high temperature pebble bed gas cooled reactor technology." Journal of Physics: Conference Series. Vol. 1127. No. 1. IOP Publishing, 2019. (Year: 2019).*
(Continued)

*Primary Examiner* — Jinney Kil
(74) *Attorney, Agent, or Firm* — Thomas | Horstemeyer, LLP

(57) ABSTRACT

The present disclosure presents systems and methods of tagging TRISO-fueled pebbles. One such method comprises acquiring an ionizing radiation image of a TRISO-fueled pebble; analyzing, using a machine learning algorithm, the acquired image of the TRISO-fueled pebble to identify a unique pattern of particle distributions that is visible in the acquired image of the TRISO-fueled pebble; deriving a TRISO-particle distribution fingerprint for the TRISO-fueled pebble that corresponds to the unique pattern of particle distributions; assigning an individual identifier to the TRISO-fueled pebble that corresponds to a TRISO-particle distribution fingerprint; and storing the TRISO-particle distribution fingerprint and the individual identifier for the TRISO-fueled pebble in an image database, wherein the image database stores a plurality of TRISO-particle distribution fingerprints and individual identifiers for a plurality of TRISO-fueled pebbles. Other systems and methods are also presented.

15 Claims, 5 Drawing Sheets

(58) Field of Classification Search
USPC .................. 376/257, 265, 266; 382/181–231
See application file for complete search history.

(56) References Cited

OTHER PUBLICATIONS

Gitau, Ernest Travis Ngure. Development and evaluation of a safeguards system concept for a pebble-fueled high temperature gas-cooled reactor. Diss. 2012. (Year: 2012).*
International Search Report and Written Opinion for International Application No. PCT/US2021/021658 mailed Jul. 28, 2021.
Zhu et al. "Uniformity Assessment of TRISO Fuel Particle Distribution in Spherical HTGR Fuel Element Using Voronoi Tessellation and Delaunay Triangulation." <https://doi.org/10.1155/2018/7274261>. vol. 2018, Article ID 7274261, 6 pages, 2018.

* cited by examiner

ROBUST AUTOMATIC TRACKING OF INDIVIDUAL TRISO-FUELED PEBBLES THROUGH A NOVEL APPLICATION OF X-RAY IMAGING AND MACHINE LEARNING

CROSS-REFERENCE TO RELATED APPLICATIONS

This application is the 35 U.S.C. § 371 national stage application of International Application No. PCT/US2021/021658, filed Mar. 10, 2021, which claims priority to U.S. provisional application entitled, "ROBUST AUTOMATIC TRACKING OF INDIVIDUAL TRISO-FUELED PEBBLES THROUGH A NOVEL APPLICATION OF X-RAY IMAGING AND MACHINE LEARNING," having Ser. No. 62/987,665, filed Mar. 10, 2020, which is entirely incorporated herein by reference.

TECHNICAL FIELD

The present disclosure is generally related to pebble bed reactors.

BACKGROUND

Pebble bed reactors (PBRs) have received increased attention in the past few years. Tri-structural isotropic (TRISO) fuel is designed to withstand the high operating temperatures of advanced gas-cooled and molten salt-cooled reactor designs. This fuel is typically fabricated into a billiard-ball-sized sphere, or "pebble", where thousands of uranium oxicarbide or uranium dioxide pellets are embedded in a 50 mm diameter graphite matrix surrounded by a 5 mm graphite layer. Tens to hundreds of thousands of TRISO-fueled pebbles along with solid moderator pebbles may be randomly arranged inside the reactor vessel to form the core of the reactor. Random pebble packing and flows, along with the multiple levels of heterogeneity inherent in these cores, present unique challenges to tracking the flow of pebbles throughout the pebble bed reactor.

SUMMARY

Embodiments of the present disclosure provide systems and methods of tagging TRISO-fueled pebbles. One such method comprises acquiring an ionizing radiation image of a TRISO-fueled pebble; analyzing the acquired image of the TRISO-fueled pebble to identify a unique pattern of particle distributions that is visible in the acquired image of the TRISO-fueled pebble; deriving a TRISO-particle distribution fingerprint for the TRISO-fueled pebble that corresponds to the unique pattern of particle distributions; assigning an individual identifier to the TRISO-fueled pebble that corresponds to a TRISO-particle distribution fingerprint; and storing the TRISO-particle distribution fingerprint and the individual identifier for the TRISO-fueled pebble in an image database, wherein the image database stores a plurality of TRISO-particle distribution fingerprints and individual identifiers for a plurality of TRISO-fueled pebbles.

The present disclosure can also be viewed as a system of tagging TRISO-fueled pebbles. One such system can be comprised of an imaging system that is configured to capture an ionizing radiation image of a TRISO-fueled pebble; and a computing device having a memory and a processor. Correspondingly, the processor can be configured to: analyze, using a machine learning algorithm, a captured image of the TRISO-fueled pebble to identify a unique pattern of particle distributions that is visible in the captured image of the TRISO-fueled pebble, wherein the captured image is an ionizing radiation image obtained from the imaging system; derive a TRISO-particle distribution fingerprint for the TRISO-fueled pebble that corresponds to the unique pattern of particle distributions; assign an individual identifier to the TRISO-fueled pebble that corresponds to the a TRISO-particle distribution fingerprint; and store the a TRISO-particle distribution fingerprint and the individual identifier for the TRISO-fueled pebble in an image database, wherein the image database stores a plurality of TRISO-particle distribution fingerprints and individual identifiers for a plurality of TRISO-fueled pebbles.

In one or more aspects for such systems and/or methods, the ionizing radiation image comprises an X-ray image; or the ionizing radiation image comprises a neutron tomography image.

In one or more aspects for such systems and/or methods, an exemplary system/method can further perform operations comprising: after storing the TRISO-particle distribution fingerprint and the individual identifier for the TRISO-fueled pebble in the image database, introducing the TRISO-fueled pebble in a pebble bed reactor (PBR) core, wherein the image database stores a TRISO-particle distribution fingerprint and an individual identifier for each TRISO-fueled pebble introduced in the pebble bed reactor core; receiving an exiting TRISO-fueled pebble from the pebble bed reactor core; acquiring an ionizing radiation image of the exiting TRISO-fueled pebble; analyzing, using the machine learning algorithm, the acquired image of the exiting TRISO-fueled pebble to identify the unique pattern that is visible in the acquired image of the exiting TRISO-fueled pebble; deriving the TRISO-particle distribution fingerprint for the exiting TRISO-fueled pebble that corresponds to the unique pattern; searching or querying the image database for the individual identifier associated with the TRISO-particle distribution fingerprint of the exiting TRISO-fueled pebble; finding or obtaining the individual identifier associated with the TRISO-particle distribution fingerprint of the exiting TRISO-fueled pebble; from the image database; tracking a flow of TRISO-fueled pebbles throughout the pebble bed reactor core based on assigned individual identifiers for the plurality of TRISO-fueled pebbles; measuring a burnup value for the exiting TRISO-fueled pebble; obtaining a stored burnup value associated with the individual identifier associated with the TRISO-particle distribution fingerprint of the exiting TRISO-fueled pebble; validating that the individual identifier was successfully found for the exiting TRISO-fueled pebble by comparing the stored burnup value with the measured burnup value; wherein the measured burnup value is determined to be within a set range of the stored burnup value; and/or training a deep neural network to analyze the captured image.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
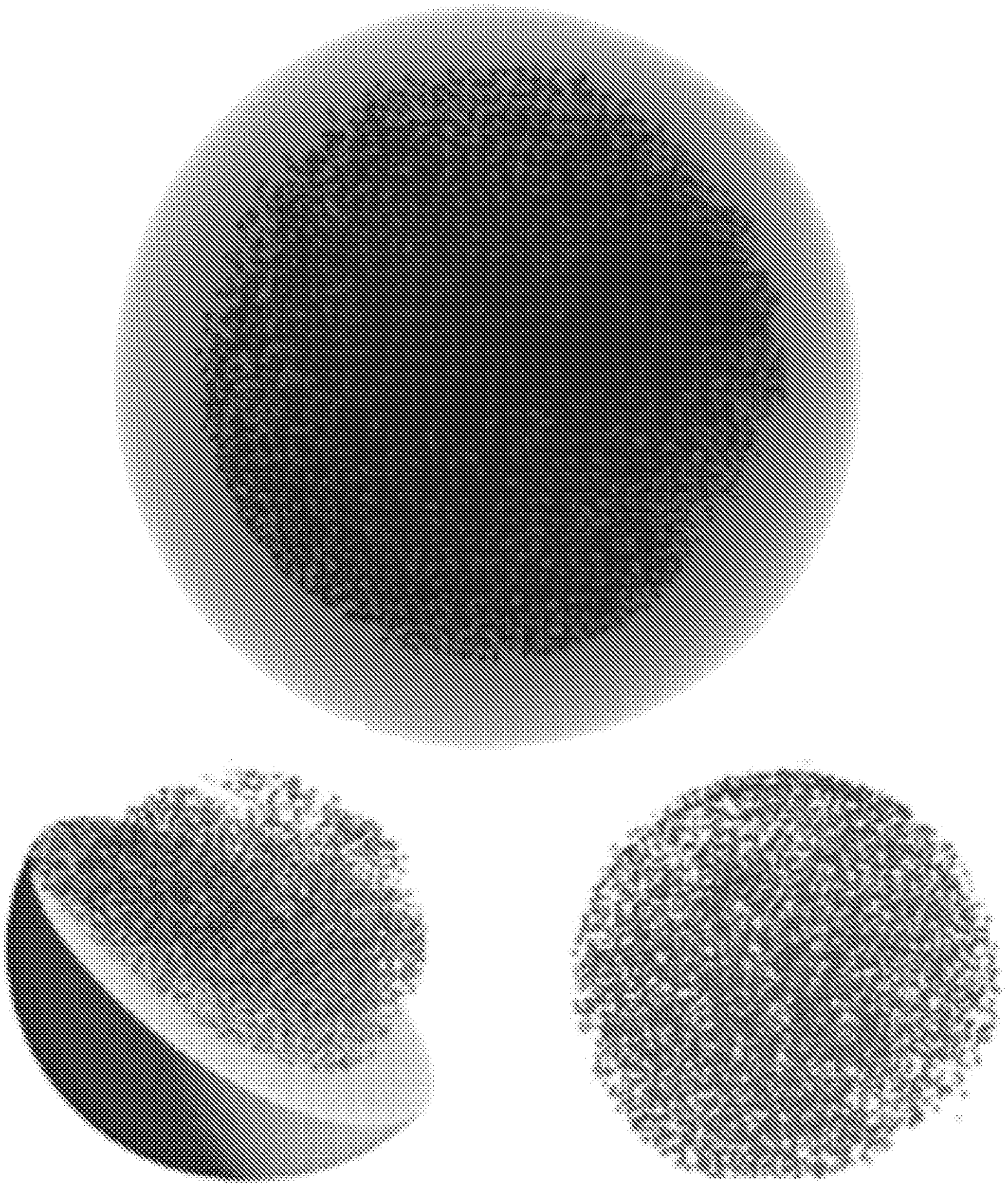
FIG. 1A shows an X-ray image (top) and neutron tomography (bottom) of a TRISO-fueled pebble.

The present disclosure describes various embodiments of systems, apparatuses, and methods for the robust, automatic tracking of individual TRISO-fueled pebbles through a pebble bed reactor (PBR) core. An exemplary method, apparatus, and/or system capitalizes on a unique feature of the TRISO-fueled pebble manufacturing process that results in an intrinsic fingerprint generated by the unique distribution of fuel particles within each pebble. This unique distribution pattern is readily visible on an ionizing radiation image, such as radiographic or tomographic images of the pebble. To illustrate, FIG. 1A shows an X-ray image (at top of figure) and a neutron tomography (at bottom of figure) of a TRISO-fueled pebble. Each pebble contains thousands of pellets arranged in an arbitrary pattern within a solid matrix that can be exploited as an intrinsic fingerprint.

In general, several PBR designs use a continuous multi-pass fueling scheme, in which the pebbles are discharged from the bottom and are reintroduced at the top of the active core continuously. Irradiated pebbles that have not exceeded a certain burnup threshold are reinserted, whereas those exceeding the burnup threshold are discharged and replaced with a fresh fuel pebble. Random pebble packing and flows, along with the multiple levels of heterogeneity inherent in these cores, present unique challenges to tracking the flow of pebbles throughout the pebble bed reactor. Such tracking can help determine if any pebbles are retained in the core for unexpectedly long periods of time, which could result in excessive burnup accumulation. It would be advantageous to tag individual pebbles in order to track the identity of each pebble as it cycles out of the reactor core following irradiation for analysis (e.g. burnup and post irradiation examination (PIE)) and potential core reentry, thus leading to improvements in safety, fuel efficiency/utilization, and cost.

Figure 1B:
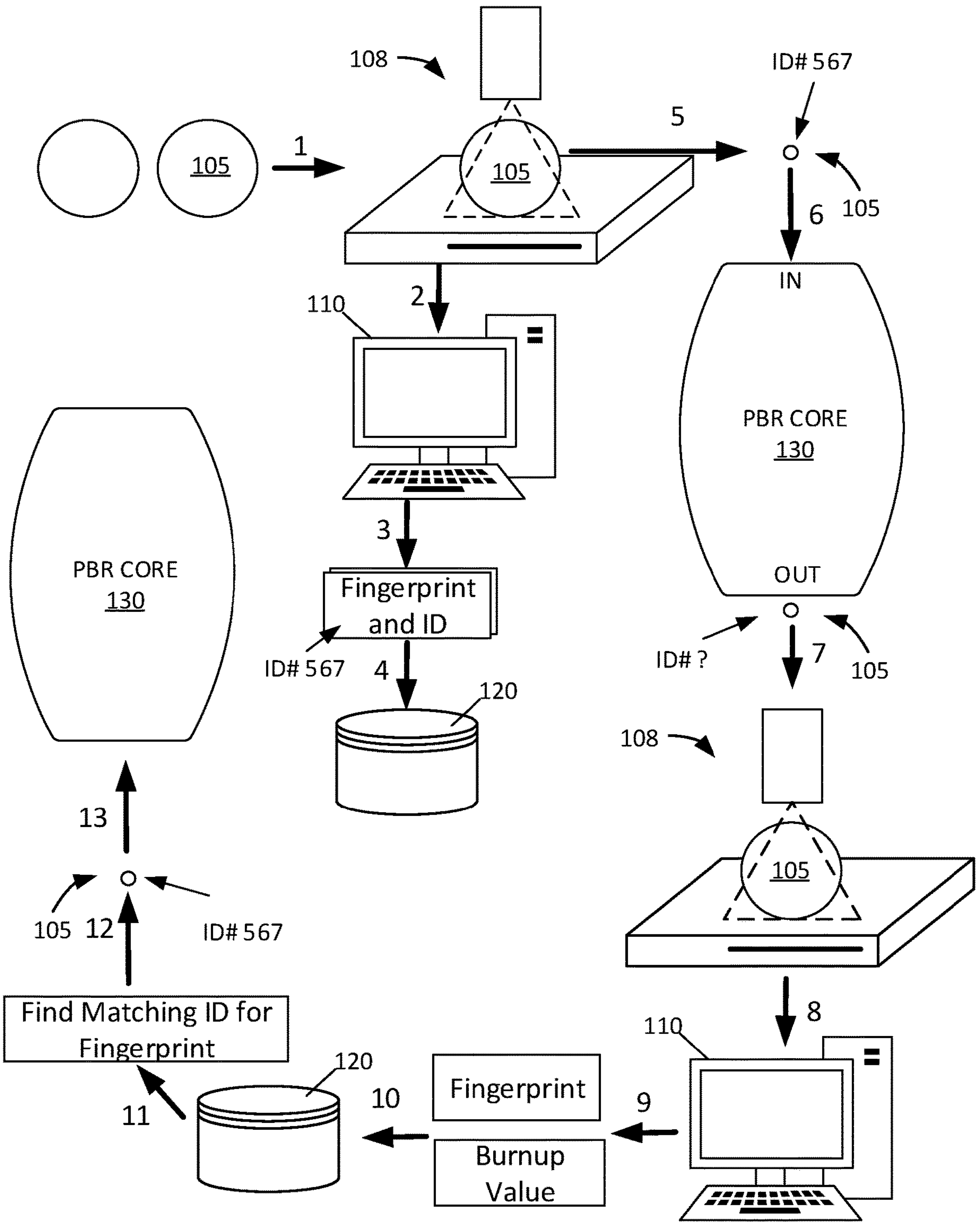
FIG. 1B shows an exemplary flow diagram of a method for tracking individual TRISO-fueled pebbles through a pebble bed reactor (PBR) core in accordance with embodiments of the present disclosure.

Thus, in various embodiments, identification and tracking of the pebbles are performed by analysis of the acquired ionizing radiation images as the pebbles enter and exit the PBR core (as represented in the exemplary flow diagram of FIG. 1B). In accordance with embodiments of the present disclosure, machine learning-based image classification algorithms are utilized to match each TRISO particle distribution fingerprint to a pebble stored in the pebble library (image database). In accordance with various embodiments, prior to inserting each TRISO-fueled pebble into the reactor core, X-ray imaging is performed on each pebble and the resultant radiographs are stored in a database. This is done in order to track individual pebbles entering the reactor core. In this way, rapid, non-contact identification of individual pebbles can be performed without altering the current TRISO-fueled pebble manufacturing process (e.g., requires no additional manufacturing steps or complexities added).

In various embodiments, image acquisition and identification are made through a novel combination of digital signal processing techniques and machine learning image classification techniques. In FIG. 1B, a TRISO-fueled pebble 105 is positioned (1) under an imaging system 108 (e.g., 2D X-ray imaging system, 3D neutron tomography imaging system, etc.). X-ray radiography is performed on the pebble at numerous orientations, allowing a collection of radiographic images of the fuel particle distribution pattern (fingerprint) to be acquired at multiple viewpoints. Next, a computing device 110 analyzes (2) acquired images and records (3) the fingerprint for the individual pebble that was generated during manufacturing of the pebble 105, which is subsequently stored (4) in the image database 120. In accordance with embodiments of the present disclosure, the captured image may also be stored with the fingerprint or signature. The fingerprint is derived or generated by the random distribution of the TRISO particles within each pebble 105 imparted during the pebble manufacturing process, as is evident or visible in the acquired image (e.g., a captured X-ray image). In one embodiment, the fingerprint identifier may be an image of the pebble itself or a vector that is derived from the pattern within the acquired image. Thus, a particular TRISO-fueled pebble 105 can be uniquely identified (5) (e.g., tagged or assigned an individual ID for each pebble, e.g., ID #567 as shown in FIG. 1B) based on the locations/patterns of the particles inside the pebble. After the image is acquired of the pebble 105, the pebble may then be introduced/re-introduced (6) to the PBR core 130 and another pebble may be imaged next. Further, in certain embodiments, burnup measurements for a pebble that has been previously removed from the core and uniquely identified can be stored in association with the individual identifier (ID) assigned to the pebble.

In general, burnup is a measure of how much energy has been extracted from the nuclear fuel (e.g., how much energy has been extracted from fission of $^{235}U$) for a nuclear reactor. Burnup measurements are routinely taken (via a burnup monitor or measuring device) after a pebble has been removed from the core to determine if the pebble should be reintroduced to the core (has not met a burnup target) or if the pebble should be sent to onsite storage (has met burnup/safety target/limits). By including the burnup measurement in an exemplary identification methodology, the identification process can be validated using the burnup measurements of individual pebbles. Accordingly, the burnup information can be used as an additional discriminator between unique pebbles. For example, based on how many trips through the core each pebble has made, each pebble would be expected to have a lower and upper limit to their measured burnup value. Therefore, a pebble that is classified as being associated with a certain identifier can have its burnup measurement compared against the previously stored measurement of a burnup value associated with the identifier. If the measured burnup value is within a set range of an expected burnup value based on the stored burnup value associated with the identifier, then identification can be validated. Otherwise, if the measured burnup value is out of range of an expected burnup value based on the stored burnup value associated with the identifier, then identification can be invalidated and the identification process can be repeated or an alert can be generated.

In certain implementations, Monte Carlo N-Particle (MCNP) Transport Code was initially chosen and used to model the TRISO-fueled pebbles. MCNP has been used in the past to model TRISO-fueled pebbles for calculations of criticality, neutron flux, etc. Over 10,000 fuel particles were modeled in a symmetric lattice filled with graphite. However, this approach could not be used to develop the pebble library for training the identification algorithm because each pebble would be identical. Therefore, it was necessary to hardcode the location of each TRISO fuel particle within the pebble. To automate this process, a program was written in MATLAB to randomly distribute more than 100,000 TRISO-fuel particles within a 50 mm diameter sphere (pebble). This simulated TRISO-fueled pebble was then sent through a function to remove fuel particles that would overlap, which consistently reduced the number of fuel particles within a pebble to 10,400±50 pellets.

Figure 2:
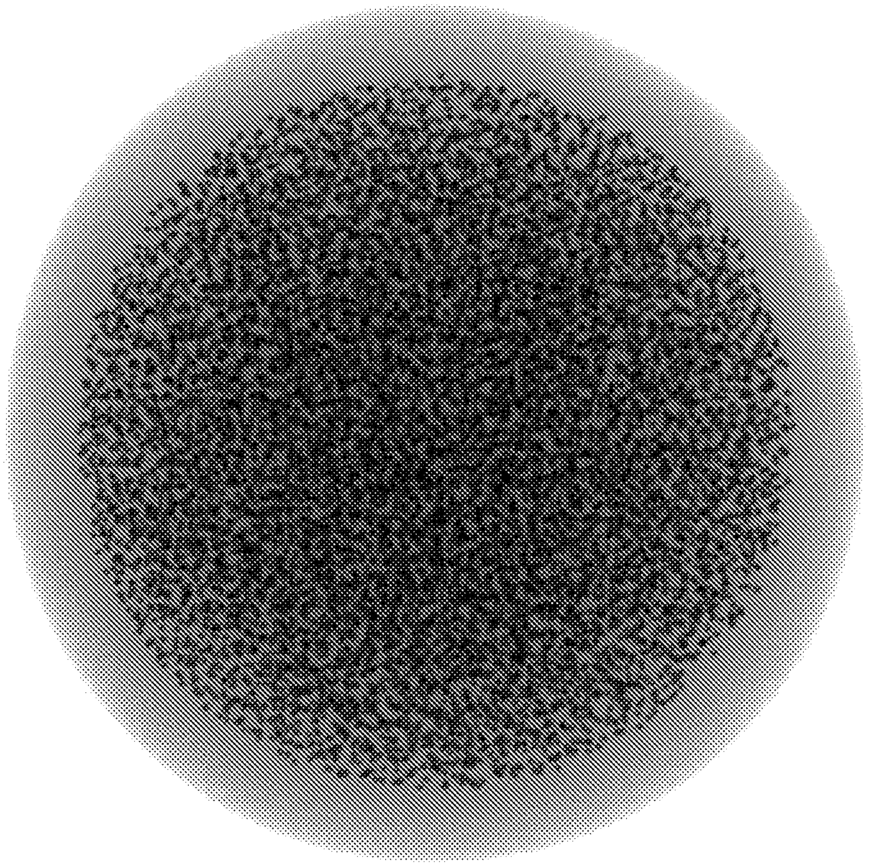
FIG. 2 shows a simulation of TRISO-fueled pebbles that are uniquely identified from TRISO-particle distribution fingerprints in accordance with embodiments of the present disclosure.

The Flux Image Radiograph (FIR) tally was used in MCNP6 to simulate radiographic images of TRISO-fueled pebbles. As such, a 150 keV X-ray beam was directed through a pebble at a CsI (Cesium Iodide) flat panel detector with a grid spacing of 200 μm. A MATLAB program was written to extract data from the MCNP output file; this data was then used to produce the radiographic image of a TRISO-fueled pebble (FIG. 2). An image library of thousands of TRISO-fueled pebbles, with images at numerous viewpoints for each pebble, has been generated with the MCNP6 and MATLAB programs described above and has been expanded to include X-ray tomography simulations of the pebbles. This library may be split into training and test groups, which can be used to develop the pebble identification machine learning algorithm. The simulated X-ray image shown in FIG. 2 represents one 2D projection of the TRISO-fueled pebble. To obtain 3D images, multiple slices (simulated or experimentally acquired) are acquired at several rotational orientations and are then stitched together using computer algorithms to generate a 3D computed tomography (CT) image as shown in FIG. 1A fora neutron tomography measurement of a TRISO pebble.

Correspondingly, in FIG. 1B, as the TRISO-fueled pebble exits (7) the PBR core 130, a new image is acquired (7 and 8) of the pebble 105 in order to identify the exiting pebble. Accordingly, a computing device 110 analyzes the acquired or captured image and generates (9) a TRISO-particle distribution fingerprint based on the random distribution of the TRISO particles within each pebble, as evident or visible in the captured image. Thus, the exiting TRISO pebble can be identified based on the locations/patterns of the particles inside the pebble by searching (10 and 11) and finding (12) a match in the image database 120 for the individual identifier (e.g., ID #567 in the figure) associated with the TRISO-particle distribution fingerprint of the exiting TRISO-fueled pebble 105. For example, the image database 120 may be queried for the individual identifier associated with the TRISO-particle distribution fingerprint of an exiting TRISO-fueled pebble from the PBR core.

As discussed, an exemplary identification process can be validated using the burnup measurements of individual pebbles. As such, the burnup information can be used as an additional discriminator between unique pebbles. For example, based on how many trips through the core each pebble has made, each pebble would be expected to have a lower and upper limit to their measured burnup value. Therefore, a pebble that is classified as being associated with a certain identifier can have its burnup measurement compared against the previously stored burnup measurement associated with the identifier. If the measured burnup value is within a set range of an expected burnup value based on the stored burnup value associated with the identifier, then identification can be validated. Otherwise, if the measured burnup value is out of range of an expected burnup value based on the stored burnup value associated with the identifier, then identification can be invalidated and the identification process can be repeated and/or an alert can be generated.

Figure 3:
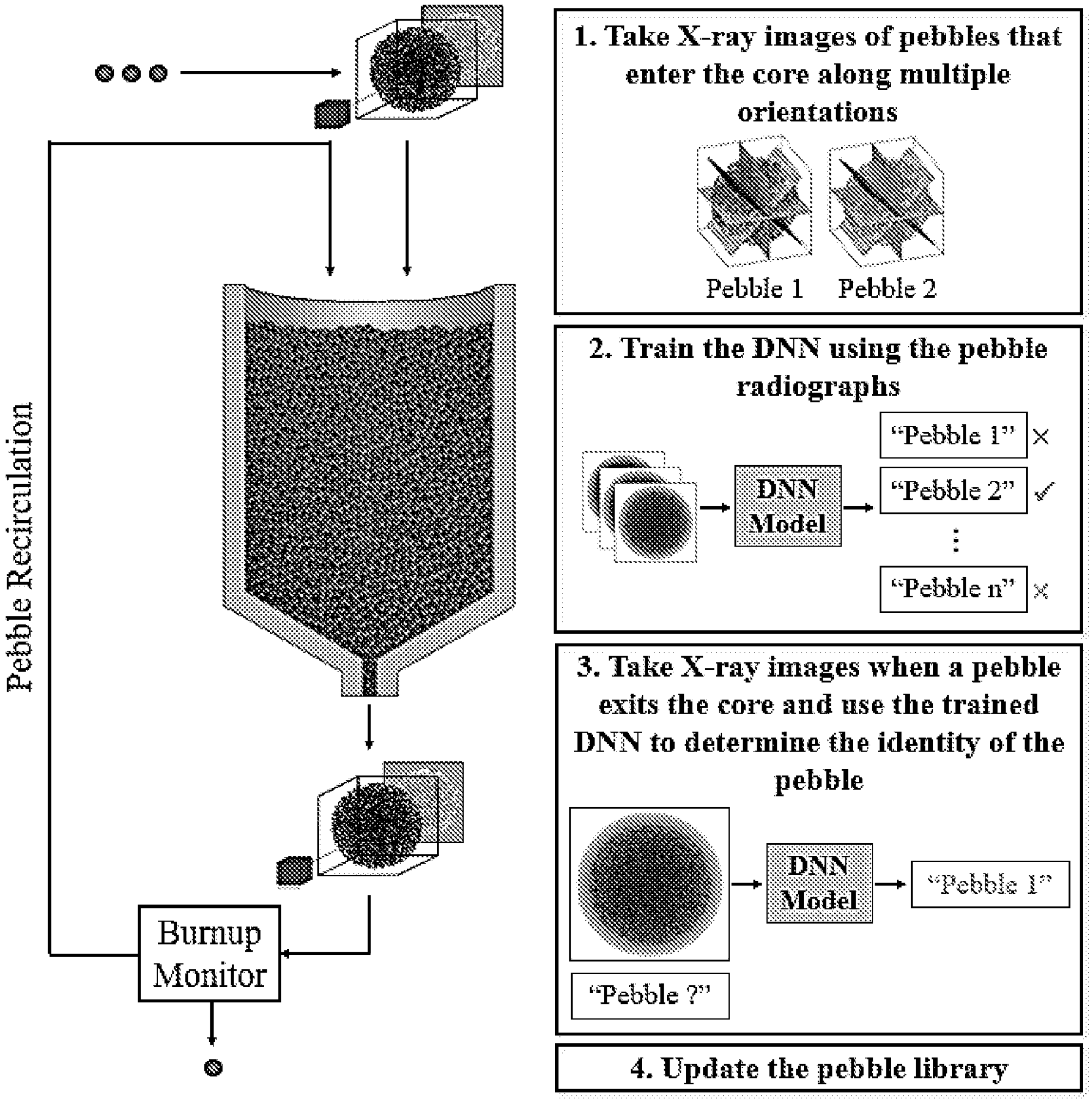
FIG. 3 demonstrates identification and attempted matching of a TRISO-particle distribution fingerprint from a newly acquired image of a TRISO-fueled pebble with stored TRISO-particle distribution fingerprints in accordance with embodiments of the present disclosure.

Referring back to FIG. 1B, identification of individual TRISO pebbles (e.g., using X-ray or neutron imaging) as the pebbles enter, exit, and possibly re-enter (13) the reactor core 130 requires no modifications or changes to manufacturing or operations processes. In various embodiments, computer analysis (e.g., machine learning algorithms and deep neural network (DNN) based image learning and classification algorithms) can be performed to record the TRISO-particle distribution fingerprint for the captured image of the exiting pebble and to match the TRISO-particle distribution fingerprint to one already contained in the image database (which may be acquired as each pebble enters the core). Experimental trials and results have shown that an exemplary identification and matching process is able to correctly identify individual pebbles, as shown in FIG. 3, in accordance with embodiments of the present disclosure. The lack of a pebble being predefined in the library has been considered, and an exemplary algorithm of the present disclosure is able to correctly identify that the pebble is not contained within the library (e.g., was not imaged before).

In various embodiments, to train an image recognition algorithm to track these pebbles, X-ray radiographs along multiple orientations are taken of the pebbles before initial placement in the core. Following the workflow outlined in FIG. 3, these X-ray images are added to a pebble library, where images of only those pebbles contained within the core are stored. Each individual pebble is assigned a classification. When a pebble exits the core, X-ray imaging is again performed and the trained DNN model is invoked to determine the identification of the pebble. Burnup measurements are also performed on the pebble. If the fuel burnup falls below the burnup threshold, then the pebble is returned to the core and the pebble library is updated by replacing previous images of that pebble classification with the new set of radiographs for that pebble. Conversely, if the pebble exceeds the burnup threshold and is not recirculated through the core, the pebble library is updated by removing the set of images for that pebble classification. A fresh pebble is then added to the reactor core and pebble library to replace the fuel that was removed. Therefore, the DNN model is trained continuously as pebbles transit the core and as new pebbles are added to the core.

Thus, in various embodiments, deep neural networks can be used in image classification of the TRISO-fueled pebble. Such deep neural networks include AlexNet, ZFNet, VGGNet, GoogleNet, ReNet, etc. In general, deep neural networks (DNN) can recognize patterns from image acquisition data of a TRISO-fueled pebble. The DNNs have been successful in wide applications and are particularly effective in image classifications. In accordance with embodiments of the present disclosure, a DNN is employed to classify the X-ray images of each TRISO-fueled pebble (that is introduced in the PBR core) based on the distribution of unique TRISO particles in each pebble as an effective signature for classification. The DNN may be trained with reference X-ray images of each pebble before it enters the reactor core. After training, the DNN processes a newly acquired image of a pebble and tags or uniquely labels the individual pebble (e.g., Pebble 1, ID567, etc.) by classifying the newly acquired image of the pebble. In this way, rapid, non-contact identification of individual pebbles can be performed without altering the current TRISO-fueled pebble manufacturing process (e.g., requires no additional manufacturing steps or complexities added).

In the DNN model, signals generated from the input layer travel through multiple layers (hidden layers) of the model to the output layer. There are two sets of layers, where the first set consists of convolutional layers to extract features from the input. These image features are extracted through the application of a combination of linear filters (convolutional kernels), pooling layers, and activation functions. The second set of layers are termed fully connected layers, which serve as classifiers using the extracted features and filters equivalent to the size of the image. Connections between all layers of the network are correlated with connection weights that the model learns by determining how much a signal should be amplified or reduced to produce accurate predictions.

In various embodiments, the deep convolutional neural network contains six convolutional layers and three fully connected layers, totaling 3.98M parameters. Weights for the convolutional and fully connected layers are initialized with a Gaussian distribution with a mean of zero and standard deviation of 0.008. All biases are initialized to zero. The ReLU activation function is applied after every layer to encourage sparsity and speed up learning. Batch normalization is also applied after every layer and average pooling is applied to the first three convolutional layers. It was found that particle information was lost with max pooling and any further average pooling layers. 3×3 convolutional filters are applied to all convolutional layers. A hyperbolic tangent activation function is applied to the output of the DNN, which is then normalized using $\ell^2$ normalization to produce the pebble embedding for the image, where the distance between vectors is computed to determine the classification of an input pebble. The DNN model can be trained using metric loss functions, such as, but not limited to, triplet loss and stochastic gradient descent.

Thus, in various embodiments, to extract the location of the fuel particles based on pixel values, a distance metric learning (DML) model is configured to predict an embedding (e.g., vector) to describe the input image (e.g., pebble radiograph), where the distance between vectors is computed to determine the classification of an input pebble. In DML, a neural network learns to predict a compact representation of the data that is fed into the network. To determine the identity, or classification, of an image, the distance (e.g. Euclidean, cosine, etc.) between its representation and other representations is computed. The partner that results in the minimum distance corresponds to the predicted classification. It's a popular choice to use DML with image verification and recognition. Metric learning is also applicable with image classification benchmarks and is applied to its widely-used datasets (CIFAR10, CIFAR100, MNIST, etc.). DML has also been applied to object recognition, hyperspectral and remote sensing scene classification, action recognition, and visual searches. In accordance with embodiments of the present disclosure, deep neural networks and distance metric learning can be applied to nuclear fuel recognition of TRISO-fueled pebbles.

As such, the unique fuel particle distribution pattern, which can be considered the particle fingerprint, is targeted and used to describe the input pebble. This fingerprint is solely based on the location of the fuel particles. Imaging physical effects of irradiation (e.g. void formation, kernel migration, etc.) within fuel particles can introduce additional features that a model would be required to learn and anticipate, which also introduce dissimilarities between radiographic (or tomographic) images of lower and higher burnup values that share the same identity (which is not desirable nor necessary). TRISO-fueled particles are designed to contain fission products and radiation damage within the particle. Cases where this containment may fail (e.g. pressure vessel failure) are reported at a probability on the order of $10^{-5}$ for temperatures less than 1,600° C. Given a pebble with 15,000 particles, it is probable that no particles will fail before the pebble exceeds the burnup threshold and is removed from circulation through the reactor core. Therefore, tracking radiation damage within the fuel particles within the DNN offers no benefit which allows the typical requirement for μm-resolution radiographic images to be removed because spatial resolutions of 100-200 μm are much more desirable in the application of tracking individual TRISO-fueled pebbles.

In brief, as shown in FIG. 3, various embodiments of an exemplary identification and matching process involve capturing X-ray images of pebbles that enter a PBR core along multiple orientations; training a DNN using the X-ray images; capturing new X-ray images when the pebbles exit the PBR core; and invoking the trained DNN to determine a tag of an exiting pebble. As discussed, when a pebble exits the core, X-ray imaging is again performed and the trained DNN model is invoked to determine the identification of the pebble. Burnup measurements are also performed on the pebble. If the fuel burnup falls below the burnup threshold, then the pebble is returned to the core and the pebble library is updated by replacing previous images of that pebble classification with the new set of radiographs for that pebble. Conversely, if the pebble exceeds the burnup threshold and is not recirculated through the core, the pebble library is updated by removing the set of images for that pebble classification. A fresh pebble is then added to the reactor core and pebble library to replace the fuel that was removed. Therefore, the DNN model is trained continuously as pebbles transit the core and as new pebbles are added to the core.

While several advanced gas-cooled and salt-cooled reactor designs currently utilize spherical fuel pebbles containing thousands of TRISO fuel particles, no method presently exists for the tagging, identification, and tracking of individual TRISO-fueled pebbles as they enter and exit the reactor core. However, there are several advantages to identifying and tracking pebbles, most notably determination of pebble transit time through the reactor to validate computational reactor physics and multiphysics models. This kind of tracking can help determine if any pebbles are retained in the core for unexpectedly long periods which could result in excessive burnup accumulation. In accordance with embodiments of the present disclosure, individual pebbles are tagged by their intrinsic TRISO-particle distribution fingerprints in order to track the identity of each pebble as the pebble cycles out of the reactor core following irradiation for analysis (e.g. burnup and post irradiation examination (PIE)) and potential core reentry, thus leading to improvements in safety, fuel efficiency/utilization, and cost.

Tagging and tracking individual TRISO-fueled pebbles via their intrinsic TRISO-particle distribution fingerprints do not require changes in current manufacturing processes, are immune to any potential abrasion or degradation of the pebble surface, are able to handle hundreds of thousands of individual pebbles, and are able to rapidly identify individual pebbles as they exit the core for analysis. As the arrangement of TRISO fuel particles themselves form the fingerprint identifying each individual pebble, the fingerprint or "tag" is able to withstand the extreme conditions inside a high-temperature gas-cooled reactor (HTGR) (e.g. high neutron fluences, burnup, and temperatures). The TRISO fuel particles are fixed within a solid graphite matrix that forms the fuel pebble, and under irradiation conditions of interest (<$9.10^{25}$ n/m$^2$, <1400° C.) shrinkage of this graphite matrix is less than 2% with respect to diameter. Therefore, the fuel particles will not shift significantly during irradiation and their locations are essentially fixed. This enables the unique particle dispersion pattern of each pebble to be used as a fingerprint.

In contrast, surface tagging/stamping of the pebbles is not a suitable method due to abrasion and degradation of the pebble surface that occurs as the pebble transits the core. Embedding of tags inside the pebble itself suffers from both difficulty in design of radiation hard tags (e.g. physical, magnetic, RF, etc.) that can be easily read and a significant increase in complexity of the pebble manufacturing process (requires embedding of individualized tags into each pebble). Neutron activation of several dopants that are individualized for and embedded into each pebble (which can then be identified through gamma spectroscopy as they exit the core) suffers from the significant impact on the pebble manufacturing process, which would require thousands of individualized dopant concentrations to be somehow embedded/incorporated into the pebbles.

Thus, embodiments of the present disclosure provide a unique and improved "all-in-one" identification and tracking methodology for individual TRISO-fueled pebbles that exploits the existing intrinsic fingerprint associated with the distribution of TRISO particles within each pebble, while also satisfying all of the requirements for a suitable tag, and thus it is strategically aligned with the Department of Energy (DOE), Nuclear Regulatory Commission (NRC), and regulatory objectives.

Figure 4:
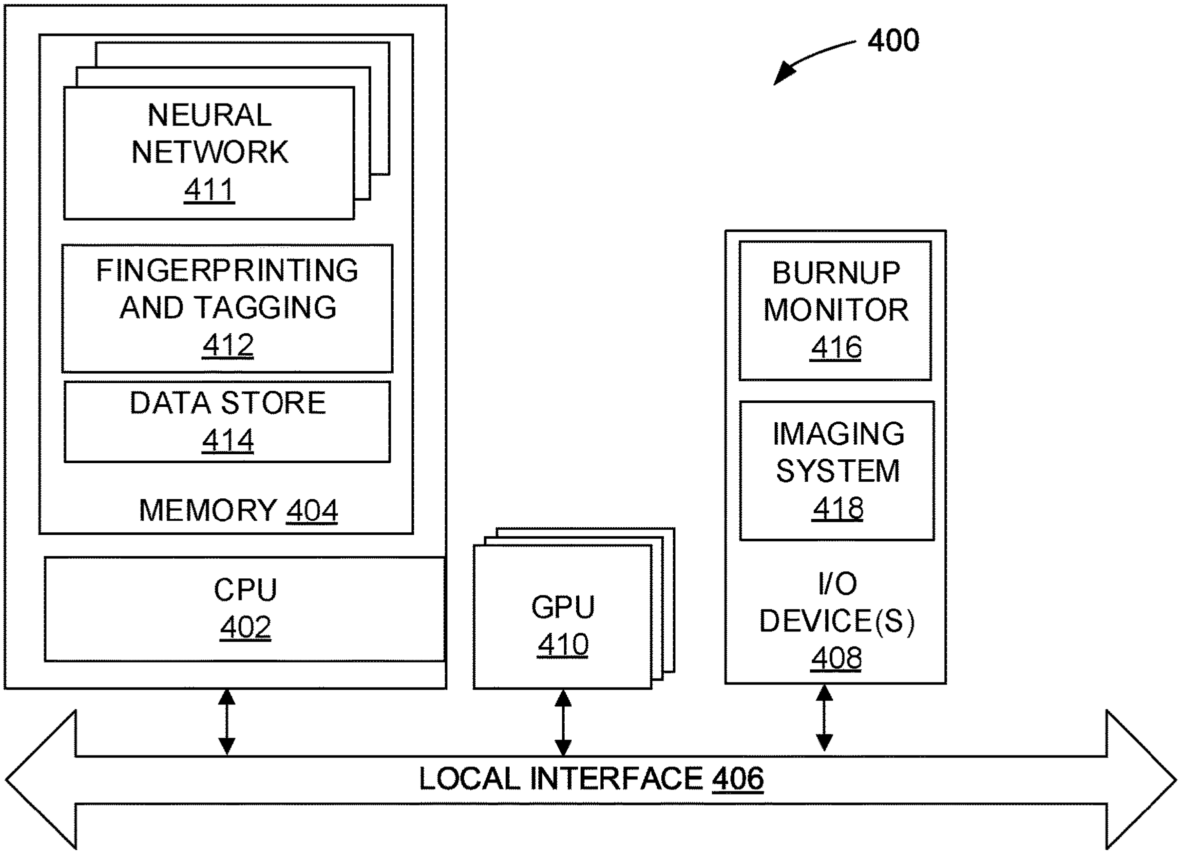
FIG. 4 provides a schematic of a computing device according to an exemplary embodiment of the present disclosure.

FIG. 4 provides a schematic of a computing device 400 according to one embodiment of the present disclosure. In example embodiments, the computing device 400 may be configured to train a deep neural network, such as a convolutional neural network or the like) for image analysis of one or more TRISO-fueled pebbles and derivation of TRISO-particle distribution fingerprints and individual identifiers. In some examples, the computing device 400 may comprise or otherwise be in communication with an image database and/or imaging system (e.g., an X-ray imaging system, a neutron tomography imaging system, etc.).

An exemplary computing device 400 includes at least one processor circuit, for example, having a processor (CPU) 402 and a memory 404, both of which are coupled to a local interface 406, and one or more input and output (I/O) devices 408. The local interface 406 may comprise, for example, a data bus with an accompanying address/control bus or other bus structure as can be appreciated. The computing device 400 further includes Graphical Processing Unit(s) (GPU) 410 that are coupled to the local interface 406 and may utilize memory 404 and/or may have its own dedicated memory. The CPU and/or GPU(s) can perform various operations such as image enhancement, graphics rendering, image/video processing, recognition (e.g., object recognition, feature recognition, etc.), image stabilization, machine learning, filtering, image classification, and any of the various operations described herein.

Stored in the memory 404 are both data and several components that are executable by the processor 402. In particular, stored in the memory 404 and executable by the processor 402 are code for implementing one or more neural networks 411 (e.g., DNNs) (or other machine learning models) and fingerprinting and tagging logic/instructions 412 that are configured to uniquely identify TRISO-fueled pebble(s). Also stored in the memory 404 may be a data store 414 and other data. The data store 414 can include an image database of stored fingerprints and identifiers for TRISO-fueled pebble(s), and potentially other data, such as burnup measurement values. In addition, an operating system may be stored in the memory 404 and executable by the processor 402. The I/O devices 408 may include input devices, for example but not limited to, a keyboard, mouse, a burnup monitor 416, an imaging system or device 418, etc. Furthermore, the I/O devices 408 may also include output devices, for example but not limited to, a printer, display, etc.

Certain embodiments of the present disclosure can be implemented in hardware, software, firmware, or a combination thereof. If implemented in software, exemplary fingerprinting and tagging logic or functionality are implemented in software or firmware that is stored in a memory and that is executed by a suitable instruction execution system. If implemented in hardware, the fingerprinting and tagging logic or functionality can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. A method for tagging a plurality of TRISO-fueled pebbles flowing throughout a pebble bed reactor core, the method comprising:

before the plurality of TRISO-fueled pebbles exit the pebble bed reactor core, for each of the plurality of TRISO-fueled pebbles:

acquiring a first ionizing radiation image of the TRISO-fueled pebble;

analyzing, using a machine learning algorithm, the acquired first ionizing radiation image of the TRISO-fueled pebble to identify a unique pattern of TRISO-fuel particle distributions within a solid graphite matrix of the TRISO-fueled pebble that is visible in the acquired first ionizing radiation image of the TRISO-fueled pebble;

deriving a TRISO-particle distribution fingerprint for the TRISO-fueled pebble that corresponds to the unique pattern of TRISO-fuel particle distributions within the solid graphite matrix of the TRISO-fueled pebble;

assigning an individual identifier to the TRISO-fueled pebble that corresponds to the TRISO-particle distribution fingerprint; and storing the TRISO-particle distribution fingerprint and the individual identifier for the TRISO-fueled pebble in an image database;

acquiring a second ionizing radiation image of one of the plurality of TRISO-fueled pebbles exiting the pebble bed reactor core;

analyzing the acquired second ionizing radiation image of the exiting TRISO-fueled pebble to identify, using the machine learning algorithm, a unique pattern of TRISO-fueled particle distributions within the solid graphite matrix of the exiting TRISO-fueled pebble that is visible in the acquired second ionizing radiation image of the exiting TRISO-fueled pebble;

deriving a TRISO-particle distribution fingerprint for the exiting TRISO-fueled pebble that corresponds to the unique pattern of TRISO-fuel particle distributions within the solid graphite matrix of the exiting TRISO-fueled pebble;

querying the image database for the individual identifier associated with the TRISO-particle distribution fingerprint of the exiting TRISO-fueled pebble;

obtaining the individual identifier associated with the TRISO-particle distribution fingerprint of the exiting TRISO-fueled pebble from the image database;

obtaining a current measurement of a burnup value for the exiting TRISO-fueled pebble;

obtaining a stored burnup value associated with the individual identifier associated with the TRISO-particle distribution fingerprint for the exiting TRISO-fueled pebble; and validating that the individual identifier was successfully found for the exiting TRISO-fueled pebble by comparing the stored burnup value with the current measurement of the burnup value.

2. The method of claim 1, wherein the acquired first ionizing radiation image of each of the plurality of TRISO-fueled pebbles comprises an X-ray image.

3. The method of claim 1, wherein the acquired first ionizing radiation image of each of the plurality of TRISO-fueled pebbles comprises a neutron tomography image.

4. The method of claim 1, further comprising:

after storing the TRISO-particle distribution fingerprint and the individual identifier for each of the plurality of TRISO-fueled pebbles in the image database, introducing the plurality of TRISO-fueled pebbles into the pebble bed reactor core.

5. The method of claim 1, wherein querying the image database comprises:

searching the image database for the individual identifier associated with the TRISO-particle distribution fingerprint of the exiting TRISO-fueled pebble; and finding the individual identifier associated with the TRISO-particle distribution fingerprint of the exiting TRISO-fueled pebble.

6. The method of claim 5, further comprising tracking the flow of the plurality of TRISO-fueled pebbles throughout the pebble bed reactor core based on the individual identifiers for the plurality of TRISO-fueled pebbles.

7. The method of claim 1, wherein comparing the stored burnup value with the current measurement of the burnup value comprises determining whether the current measurement of the burnup value is within a set range of the stored burnup value.

8. The method of claim 1, further comprising:

obtaining a measurement of a burnup value for each of the plurality of TRISO-fueled pebbles before the plurality of TRISO-fueled pebbles exit the pebble bed reactor core; and storing the measurement of the burnup value for each of the plurality of TRISO-fueled pebbles, wherein the measurements of the burnup value are associated with the respective individual identifier for the respective TRISO-fueled pebble, wherein the obtained stored burnup value is one of the stored measurements of the burnup value.

9. A system for tagging a plurality of TRISO-fueled pebbles flowing throughout a pebble bed reactor core, the system comprising:

an imaging system that is configured to capture ionizing radiation images of the plurality of TRISO-fueled pebbles; and a computing device having a memory and a processor, wherein, before the plurality of TRISO-fueled pebbles exit the pebble bed reactor core, for each of the plurality of TRISO-fueled pebbles, the processor is configured to:

analyze, using a machine learning algorithm, a first captured image of the TRISO-fueled pebble to identify a unique pattern of TRISO-fuel particle distributions within a solid graphite matrix of the TRISO-fueled pebble that is visible in the first captured image of the TRISO-fueled pebble, wherein the first captured image is a first ionizing radiation image obtained from the imaging system;

derive a TRISO-particle distribution fingerprint for the TRISO-fueled pebble that corresponds to the unique pattern of TRISO-fuel particle distributions within the solid graphite matrix of the TRISO-fueled pebble;

assign an individual identifier to the TRISO-fueled pebble that corresponds to the TRISO-particle distribution fingerprint; and store the TRISO-particle distribution fingerprint and the individual identifier for the TRISO-fueled pebble in an image database;

wherein the processor is further configured to:

acquire a second image of one of the plurality of TRISO-fueled pebbles exiting the from a pebble bed reactor core;

analyze the acquired second image of the exiting TRISO-fueled pebble to identify, using the machine learning algorithm, a unique pattern of TRISO-fueled particle distributions within the solid graphite matrix of the exiting TRISO-fueled pebble that is visible in the acquired second image of the exiting TRISO-fueled pebble, wherein the acquired second image is a second ionizing radiation image obtained from the imaging system;

derive a TRISO-particle distribution fingerprint for the exiting TRISO-fueled pebble that corresponds to the unique pattern of TRISO-fuel particle distributions within the solid graphite matrix of the exiting TRISO-fueled pebble;

query the image database for the individual identifier associated with the TRISO-particle distribution fingerprint of the exiting TRISO-fueled pebble;

obtain the individual identifier associated with the TRISO-particle distribution fingerprint of the exiting TRISO-fueled pebble from the image database;

obtain a current measurement of a burnup value for the exiting TRISO-fueled pebble;

obtain a stored burnup value associated with the individual identifier associated with the TRISO-particle distribution fingerprint for the exiting TRISO-fueled pebble; and validate that the individual identifier was successfully found for the exiting TRISO-fueled pebble by comparing the stored burnup value with the current measurement of the burnup value.

10. The system of claim 9, wherein the first captured image of each of the plurality of TRISO-fueled pebbles comprises an X-ray image.

11. The system of claim 9, wherein the first captured image of each of the plurality of TRISO-fueled pebbles comprises a neutron tomography image.

12. The system of claim 9, wherein the processor is further configured to track the flow of the plurality of TRISO-fueled pebbles throughout the pebble bed reactor core based on the individual identifiers for the plurality of TRISO-fueled pebbles.

13. The system of claim 9, wherein comparing the stored burnup value with the current measurement of the burnup value comprises determining whether the current measurement of the burnup value is within a set range of the stored burnup value.

14. The system of claim 9, wherein the computing device is configured to train a deep neural network to analyze captured image of each of the plurality of TRISO-fueled pebbles using the machine learning algorithm, wherein the deep neural network is executed by the processor of the computing device.

15. The system of claim 9, wherein the processor is further configured to:

obtain a measurement of a burnup value for the individual each of the plurality of TRISO-fueled pebbles before the plurality of TRISO-fueled pebbles exit the pebble bed reactor core; and store the measurement of the burnup value for the individual each of the plurality of TRISO-fueled pebbles, wherein the measurements of the burnup value are associated with the respective individual identifier for the individual respective TRISO-fueled pebble, wherein the obtained stored burnup value is one of the stored measurements of the burnup value.

* * * * *